US012123318B2

(12) United States Patent
Klein et al.

(10) Patent No.: US 12,123,318 B2
(45) Date of Patent: Oct. 22, 2024

(54) TURBOMACHINE BLADE WITH IMPROVED COOLING HOLES

(71) Applicant: SAFRAN AIRCRAFT ENGINES, Paris (FR)

(72) Inventors: Guillaume Klein, Moissy-Cramayel (FR); Marine Laeticia Camille Chevalier, Moissy-Cramayel (FR); Julien Jerome Mathieu Reingpach, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/117,359

(22) Filed: Aug. 30, 2018

(65) Prior Publication Data

US 2019/0071981 A1   Mar. 7, 2019

(30) Foreign Application Priority Data

Sep. 1, 2017   (FR) ..................................... 17 58119

(51) Int. Cl.
  *F01D 5/18* (2006.01)
(52) U.S. Cl.
  CPC ............. *F01D 5/187* (2013.01); *F01D 5/186* (2013.01); *F05D 2220/323* (2013.01); *F05D 2240/30* (2013.01); *F05D 2250/10* (2013.01); *F05D 2250/52* (2013.01); *F05D 2260/20* (2013.01)
(58) Field of Classification Search
  CPC ...... F01D 5/186; F01D 5/187; F05D 2240/30; F05D 2250/10; F05D 2260/20; F05D 2250/52; F05D 2220/323
  See application file for complete search history.

(56) References Cited

U.S. PATENT DOCUMENTS

| 4,664,597 | A | | 5/1987 | Auxier et al. | |
|---|---|---|---|---|---|
| 4,672,727 | A | | 6/1987 | Field | |
| 5,503,529 | A | * | 4/1996 | Anselmi | F01D 5/186 416/90 R |
| 6,287,075 | B1 | * | 9/2001 | Kercher | F01D 5/186 415/115 |
| 7,186,085 | B2 | * | 3/2007 | Lee | F01D 5/186 416/97 R |

(Continued)

OTHER PUBLICATIONS

French Preliminary Search Report issued Apr. 25, 2018 filed in French Application 17 58119 filed Sep. 1, 2017 (with English Translation of Categories of Cited Documents).

*Primary Examiner* — Brian P Wolcott
(74) *Attorney, Agent, or Firm* — Oblon, McClelland, Maier & Neustadt, L.L.P.

(57) ABSTRACT

A turbomachine blade that includes an airfoil that includes an intrados wall, an extrados wall, a leading edge, a trailing edge, an internal cavity and a plurality of cooling holes made in the walls and leading and trailing edges, each cooling hole connecting the internal cavity to the exterior, one end of each cooling hole opening up into the cavity, the other end of each cooling hole opening to the exterior through an outlet, wherein the cooling holes are distributed in at least one first alignment and a second alignment made in a wall of the airfoil, wherein this outlet of at least one of the cooling holes belonging to at least the second alignment is an oblong shape with its long dimension along the principal direction of said second alignment.

9 Claims, 1 Drawing Sheet

(56) References Cited

U.S. PATENT DOCUMENTS

| | | | | |
|---|---|---|---|---|
| 7,249,934 B2* | 7/2007 | Palmer | ............... | F01D 5/20 |
| | | | | 416/97 R |
| 7,255,534 B2* | 8/2007 | Liang | ............... | F01D 5/14 |
| | | | | 415/115 |
| 7,789,625 B2* | 9/2010 | Liang | ............... | F01D 5/186 |
| | | | | 415/115 |
| 8,052,378 B2* | 11/2011 | Draper | ............... | F01D 5/186 |
| | | | | 415/115 |
| 8,057,182 B2* | 11/2011 | Brittingham | ............... | F01D 5/186 |
| | | | | 415/115 |
| 8,245,519 B1* | 8/2012 | Liang | ............... | F01D 5/186 |
| | | | | 415/115 |
| 8,777,571 B1* | 7/2014 | Liang | ............... | F01D 5/187 |
| | | | | 416/97 R |
| 8,870,536 B2* | 10/2014 | Lacy | ............... | F01D 5/186 |
| | | | | 416/97 R |
| 2010/0129231 A1 | 5/2010 | Brittingham et al. | | |
| 2016/0169004 A1* | 6/2016 | Quach | ............... | F01D 9/041 |
| | | | | 60/752 |

* cited by examiner

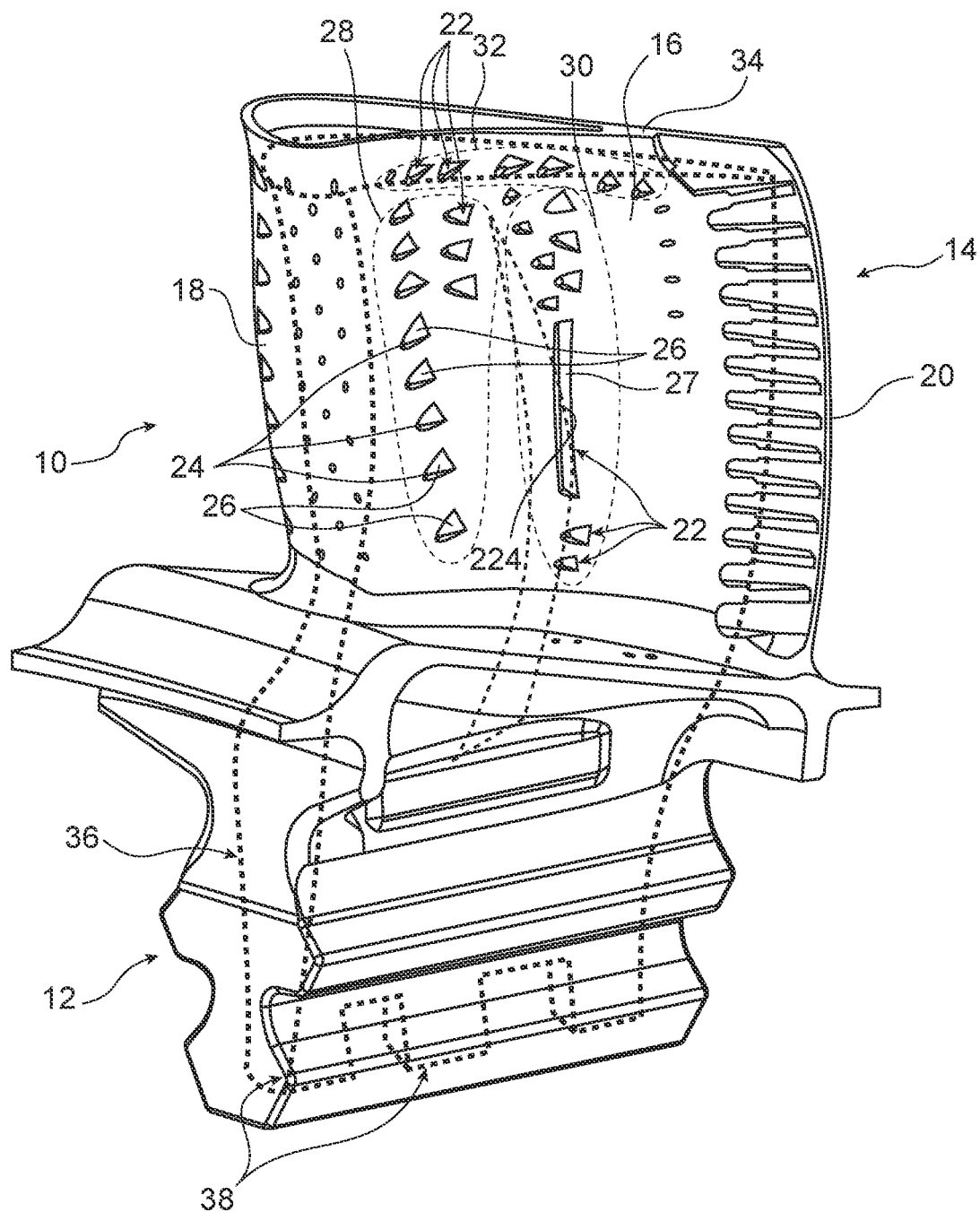

TURBOMACHINE BLADE WITH IMPROVED COOLING HOLES

TECHNICAL DOMAIN

The invention relates to a turbomachine blade comprising improved cooling means.

The invention most particularly relates to a high pressure turbine blade in which the distribution of cooling holes is sufficient to efficiently cool each zone.

STATE OF PRIOR ART

High pressure turbine blades of a turbomachine are subjected to high temperatures of gases output from the combustion chamber.

Overheating of a blade can reduce the mechanical strength of the blade and therefore result in local or global deterioration of the blade.

A cooling air flow is made to pass through the blade to limit this deterioration of the blade.

This cooling air circulates inside one or several blade cavities and exits at the intrados and extrados walls through a plurality of cooling holes.

The distribution of these cooling holes is defined as a function of the distribution of mechanical stresses and temperatures in the blade.

To achieve this, it has been proposed to distribute holes forming two alignments oriented along the radial principal direction of the blade, and at the tip of the blade.

It has been observed on an alignment of holes located close to the trailing edge of the blade that a large number of holes has to be made on a segment of this alignment.

The high concentration of holes in such a segment of each alignment of holes makes it possible to significantly cool the blade zone at these segments. However, this concentration of holes also weakens the wall of the blade. Thus, during use of the blade, there is a risk of cracks appearing that can cause local breakage of the blade.

Furthermore, formation of this plurality of holes takes a longer time because the holes are formed one after the other.

The purpose of this invention is to propose a turbomachine blade comprising cooling holes to provide good cooling of the blade at all points of the blade, and that create fewer stress concentrations.

PRESENTATION OF THE INVENTION

The invention discloses a turbomachine blade that comprises an airfoil that comprises an intrados wall, an extrados wall, a leading edge, a trailing edge, an internal cavity and a plurality of cooling holes made in the walls and the leading and trailing edges of the blade, each cooling hole connecting the internal cavity to the exterior, one end of each cooling hole opening up into the cavity, the other end of each cooling hole opening to the outside through an outlet, in which the cooling holes are distributed in at least one first alignment and a second alignment made in a wall of the airfoil, characterised in that the outlet of at least one of the cooling holes belonging to at least the second alignment is oblong shaped with its long dimension along the principal direction of said second alignment.

The creation of such a cooling hole comprising an outlet with an elongated oblong shape capable of carrying a sufficient cooling air flow to achieve cooling, without having a large number of stress concentrations located at the elongated opening.

Preferably, each cooling hole comprises at least one conduit extending through the thickness of the ventilation wall from the internal cavity as far as the outlet and said at least one conduit of said at least one cooling hole comprising an oblong outlet, is oblong shaped elongated along the principal direction of said second alignment.

Preferably, said oblong shaped conduit extends approximately along the entire length of the outlet of the cooling hole.

Preferably, the outlet is tapered outwards towards the trailing edge from the conduit.

Preferably, the length of the oblong shaped outlet of a cooling hole is less than or equal to 30% of the length of the airfoil.

Preferably, several of the cooling holes forming the second alignment comprise an oblong shaped outlet.

Preferably, at least the second alignment extends along the principal direction of the airfoil.

Preferably, a cooling hole comprising an oblong shaped outlet belongs to at least one other alignment of cooling holes among an alignment made in the leading edge of the airfoil; an alignment made in the trailing edge of the airfoil and an alignment made at the tip of the airfoil, that is approximately perpendicular to the principal orientation of the airfoil.

Preferably, the first alignment of holes is located on said wall close to the leading edge and the second alignment of cooling holes is located on said wall close to the trailing edge.

The invention also relates to a turbine of a turbomachine comprising a plurality of blades according any one of the preceding claims that are mounted on a rotor.

BRIEF DESCRIPTION OF THE DRAWINGS

Other characteristics and advantages of the invention will become clear after reading the detailed description given below that should be read with reference to the single FIGURE that is a diagrammatic perspective representation of an airfoil of a turbomachine, the blade of which comprises cooling holes and that is made in accordance with the invention.

DETAILED PRESENTATION OF PARTICULAR EMBODIMENTS

The single FIGURE shows a turbomachine blade 10, for example a turbine blade 10 for an aircraft turbomachine.

The blade 10 comprises a root 12 for assembly on a turbomachine rotor and an airfoil 14 on which the combustion gas flow acts to operate the turbomachine.

The airfoil 14 is oriented principally in a radial direction relative to the principal axis of the rotor on which the blade 10 is to be mounted and extends along its radial principal direction along the prolongation of the root 12.

The airfoil 14 conventionally comprises an intrados face 16, an extrados face (not visible), a leading edge 18 and a trailing edge 20. In this case, although only the intrados wall 12 can be seen on the figures, it will be understood that the invention can also be applied on the extrados wall, not shown.

The blade 10 is a turbine blade of the turbomachine and hot gases from the turbomachine combustion chamber come into contact with the airfoil 14. These gases then provoke overheating of the airfoil 14 that can damage its integrity if the temperature is excessive.

For this reason, the airfoil 14 comprises means for cooling it consisting of an internal cavity 36 made inside the airfoil 14 and that is supplied with a cooling air flow.

Cooling air supply conduits 38 are formed in the root 12 of the blade 10 and they open up in the internal cavity 36.

The airfoil 14 also comprises cooling holes 22 that are distributed on the intrados wall 16 and that connect the internal cavity 36 to the exterior of the airfoil 14.

These cooling holes carry cooling air supplied through the internal cavity 36 as it escapes to the intrados wall to cool the intrados wall.

Each cooling hole 22 comprises a conduit 24 that is connected directly to the internal cavity 36 and an outlet 26 through which the cooling hole 22 opens up in the intrados wall 16.

As can be seen on the single FIGURE, the cooling holes 22 are distributed on the leading edge 18, the trailing edge 20 and on each intrados 16 and extrados wall. In the following description, reference will be made to the cooling holes 22 in the intrados wall 16. It will be understood that the invention is not limited to the formation of these cooling holes and that it also relates to the cooling holes 22 in the extrados wall, and the entire zone of the airfoil 14 that comprises a dense concentration of cooling holes 22.

The cooling holes are distributed on the intrados wall 16 forming two alignments 28, 30 of cooling holes 22 that are globally parallel to the principal orientation of the airfoil 14. It will be understood that the invention is not limited to this orientation of alignments, that can be inclined related to the radial principal orientation of the airfoil 14.

A first alignment 28 is located close to the leading edge 18, the second alignment 30 is located close to the trailing edge 20. The cooling holes 22 are also distributed on the intrados wall 16 in an alignment 32 of cooling holes approximately perpendicular to the principal orientation of the airfoil 14 and preferably parallel to the edge 34 of the free end of the airfoil 14.

It has been observed that a portion of the intrados wall 16 that is located close to the trailing edge 20 and in an intermediate part of the airfoil 14, along its principal orientation, is subjected to high thermomechanical loads during operation of the turbomachine.

Thus, the cooling holes 22 must be designed to provide sufficient cooling of this portion of the intrados wall.

To achieve this, the second alignment 30 of cooling holes 22 comprises at least one cooling hole 22, the outlet 27 of which is an oblong shape with its long dimension along the principal direction of the second alignment.

In this case a single cooling hole 22 in the second alignment 30 comprises an oblong shaped outlet 27, it will be understood that several cooling holes 22 in the second alignment 30 of cooling holes 22 may each have an oblong shaped outlet 27.

According to one preferred embodiment, the conduit 224 of the cooling hole 22 that comprises an oblong shaped outlet 27 is also oblong in shape and has the same orientation as the outlet 27, in other words in this case the long direction of the conduit 224 is along the principal direction of the blade 14.

Such a conduit 224 enables a large quantity of cooling air to flow through this cooling hole 22.

Furthermore, according to one preferred embodiment, the outlet 27 is formed by making a taper from the oblong conduit 224 associated with it in the direction of the trailing edge 20 of the airfoil 14.

According to a first embodiment shown on the single FIGURE, the oblong shaped conduit 224 extends over approximately the same length as the oblong shaped outlet 27 of the same cooling hole 22.

According to one variant embodiment (not shown), the cooling hole 22 that comprises an oblong shaped outlet 27 comprises a plurality of conduits 24 connecting the oblong outlet 27 to the cavity formed in the blade 14 and that are distributed along the length of the cooling hole 22. Each of these conduits 24 associated with the oblong shaped outlet 27 may or may not in turn be oblong shaped.

According to one preferred embodiment, the length of the oblong shaped outlet 27 is less than or equal to 30% of the radial length of the airfoil 14.

In the above description, a cooling hole 22 was described comprising an oblong outlet 26 as forming part of the second alignment 30. It will be understood that the invention is not limited to this embodiment and that a cooling hole 22 forming part of one of several other alignments 28, 32 may comprise an oblong outlet 26.

The invention claimed is:

1. A turbomachine blade comprising:
    an airfoil comprising
        an intrados wall,
        an extrados wall,
        a leading edge,
        a trailing edge,
        an internal cavity, and
        a plurality of cooling holes made in the intrados and extrados walls and the leading and trailing edges, each cooling hole of the plurality of cooling holes connecting the internal cavity to an exterior, a first end of each cooling hole of the plurality of cooling holes opening up into the internal cavity, a second end of each cooling hole of the plurality of cooling holes opening to the exterior through an outlet,
    wherein the plurality of cooling holes are distributed in a first alignment and a second alignment made in the intrados or extrados wall of the airfoil, the second alignment being closer to the trailing edge than the first alignment and being made of a single group of holes aligned radially,
    wherein the outlet of at least one cooling hole of a plurality of cooling holes belonging to the second alignment is oblong shaped with a long dimension thereof along a principal direction of said second alignment and every outlet of every other cooling hole of the plurality of cooling holes belonging to the second alignment are non-oblong shaped,
    wherein in the second alignment, the at least one cooling hole of the plurality of cooling holes with the oblong-shaped outlet is radially between two cooling holes of the every other cooling hole of the plurality of cooling holes with the non-oblong shaped outlets, and
    wherein the long dimension of each of the at least one oblong-shaped outlet overlaps radially at least three cooling holes of the plurality of cooling holes belonging to the first alignment arranged along a principal direction of said first alignment.

2. The blade according to claim 1, wherein each cooling hole of the plurality of cooling holes comprises at least one conduit extending through a thickness of said intrados or extrados wall from the internal cavity as far as the outlet,
    wherein said at least one conduit of said at least one cooling hole of the plurality of cooling holes comprising the oblong outlet is oblong shaped and elongated along the principal direction of said second alignment.

3. The blade according to claim 2, wherein said at least one oblong shaped conduit extends approximately along an entire length of the oblong outlet of the at least cooling hole of the plurality of cooling holes.

4. The blade according to claim 3, wherein the oblong outlet is tapered outwards towards the trailing edge from the at least one oblong shaped conduit.

5. The blade according to claim 1, wherein several of the cooling holes forming the second alignment comprise an oblong shaped outlet.

6. The blade according to claim 1, wherein a cooling hole comprising an oblong shaped outlet belongs to at least one other alignment of cooling holes among an alignment made in the leading edge of the airfoil; an alignment made in the trailing edge of the airfoil and an alignment made at a tip of the airfoil, that is approximately perpendicular to a principal orientation of the airfoil.

7. The blade according to claim 1, wherein the first alignment of cooling holes is located on said intrados or extrados wall close to the leading edge and the second alignment of cooling holes is located on said intrados or extrados wall close to the trailing edge.

8. A turbine of a turbomachine comprising a plurality of blades according to claim 1, that is mounted on a rotor.

9. The blade according to claim 1, wherein a length of the oblong shaped outlet of a cooling hole is less than or equal to 30% of a length of the airfoil.

* * * * *